United States Patent
Hughes et al.

(10) Patent No.: US 8,468,519 B2
(45) Date of Patent: Jun. 18, 2013

(54) MULTIPLE ORGANIZATION SUPPORT IN A NETWORKED SYSTEM

(75) Inventors: Shannon Ray Hughes, Fuquay Varina, NC (US); Maureen E. Duffy, Somerville, MA (US); Michael B. McCune, Beaverton, OR (US); Pradeep Kilambi, Raleigh, NC (US); James S. Slagle, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1005 days.

(21) Appl. No.: 12/199,646

(22) Filed: Aug. 27, 2008

(65) Prior Publication Data
US 2010/0058324 A1    Mar. 4, 2010

(51) Int. Cl.
*G06F 9/44* (2006.01)
(52) U.S. Cl.
USPC ............................. 717/174; 726/26

(58) Field of Classification Search
USPC ........................................................ 717/174
See application file for complete search history.

(56) References Cited

U.S. PATENT DOCUMENTS 6,799,277 B2 *   9/2004   Colvin ........................... 726/22
7,383,576 B2 *   6/2008   Hitchcock ...................... 726/17

* cited by examiner

*Primary Examiner* — Don Wong
*Assistant Examiner* — Deric Ortiz
(74) *Attorney, Agent, or Firm* — Lowenstein Sandler LLP

(57) ABSTRACT

Some embodiments of multiple organization support in a networked system have been presented. In one embodiment, a centralized server manages a networked system, which includes the centralized server and a set of computing machines coupled to each other within an internal network of a customer. The centralized server segregates data within the networked system by grouping data into the concept of an organization created by the customer in order to isolate the organizations.

24 Claims, 18 Drawing Sheets

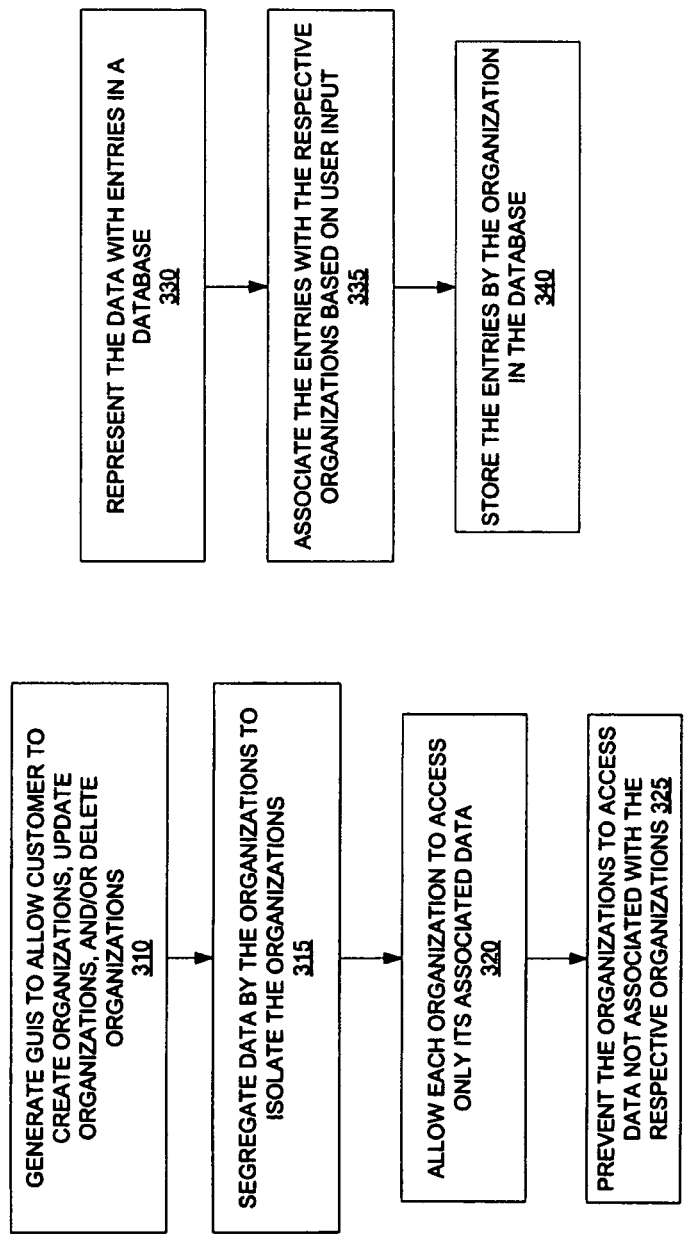

FIG. 4A

Users Across Satellite

The following is a list of all users on this Satellite, across organizations. Note that you will only have access to modify the details of users that are members of this organization you are currently logged into ( Security Co. ), and only if you have organization administrator privileges for this organization.

Filter by Login: [ ] Go!

A B C D E F G H I J K L M N O P Q R S T U V W X Y Z 0 1 2 3 4 5 6 7 8 9

1-5 of 237

| Login | Real Name | Organization | Organization Admin? |
|---|---|---|---|
| chewy | Wookiee, Chewbacca | Security Co. | YES |
| d_vader | Vader, Darth | Acme Corp | ○ |
| hellok | Kitty, Hello | Toy Store | YES |
| linnyT | Torvalds, Linux | Information Technology | ○ |
| paris@hilton.com | Hilton, Paris | Hilton Hotels International | ○ |

System Entitlements Across Satellite

The following is a list of all system entitlements on this Satellite, across organizations, and their usage. Click on the entitlement's name for more details about it, or click on its usage counts for more detailed usage information.

A B C D E F G H I J K L M N O P Q R S T U V W X Y Z 0 1 2 3 4 5 6 7 8 9

Filter by Entitlement Name: [    ] Go!

1-5 of 5

| Entitlement Name | | | |
|---|---|---|---|
| Management (Base) | 800 | 567 | 233 |
| Provisioning (Add-On) | 400 | 128 | 272 |
| Monitoring (Add-On) | 5 | 3 | 2 |
| Virtualization (Add-On) | 10 | 4 | 6 |
| Virtualization Platform (Add-On) | 2 | 2 | 0 |

1-5 of 5

*Tip: 'Allocated' refers to the total number of entitlements, either used by a registered system or not, that have bi allocated to a particular organization.
'Not Allocated' refers to the number of entitlements that are not allocated to any organization.
'Not in Use' refers to entitlements that have been allocated to an organization but are not currently consun by a system.

| Your RHN | Systems | Errata | Channels | Configuration | Schedule | Users | Satellite Tools | Help |

Acme Corporation 　　　　　　　　　　　　　　　　　　NO SYSTEMS SELECTED | MANAGE

Satellite Configuration
Organizations
Users
Subscriptions
Task Engine Status Details　Users　Subscriptions delete organization The following is a list of all users in the Acme Corp. organization. Note that you will only have access to modify the details of these users if you are logged into the Acme Corp. organization and have organization administrator privileges.

A B C D E F G H I J K L M N O P Q R S T U V W X Y Z 0 1 2 3 4 5 6 7 8 9

Filter by Login: [   ] Go!

1-5 of 237

| Login | Real Name | Organization Admin? |
|---|---|---|
| chewy | Wookiee, Chewbacca | YES |
| d_vader | Vader, Darth | ○ |
| hellok | Kitty, Hello | YES |
| linnyT | Torvalds, Linux | ○ |
| paris@hilton.com | Hilton, Paris | ○ |

1-5 of 237

470 — (screen)
472 — user list
472A — Vader, Darth
472C — Kitty, Hello
474 — Go!
476 — Organization Admin?

FIG. 4G

Red Hat Enterprise Linux (core server)

delete organization

Details Organizations

Entitlement Usage — 532

- Total Available: Total: 2400, Used: 900, Free: 1500 (532A, 532B, 532C)
  Tip: These numbers reflect what the current counts are for this entitlement right now across organizations.

- Organization Usage: 3 of the 6 organizations on this Satellite have at least one registered system using this entitlement. (532D)

Access Granted by this Entitlement — 534

A single 'Red Hat Enterprise Linux (core server)' entitlement may be used to gain access to any one of the following software channels:

| Channel Name | Packages | |
|---|---|---|
| ☐ Red Hat Enterprise Linux (v. 5 for 32-bit x86) | 2469 | |
| ☐ Red Hat Enterprise Linux (v. 5 for 64-bit x86_64) | 3227 | |
| ☐ Red Hat Enterprise Linux (v. 5 for 64-bit Itanium) | 2532 | |
| ☐ Red Hat Enterprise Linux (v. 5 for 64-bit IBM POWER) | 3189 | |
| ☐ Red Hat Enterprise Linux AS (v. 4 for 32-bit x86) | 4376 | |
| ☐ Red Hat Enterprise Linux AS (v. 4 for 64-bit Intel Itanium) | 4718 | |
| ☐ Red Hat Enterprise Linux AS (v. 4 for 64-bit AMD64/Intel EM64T) | 4983 | |
| ☐ Red Hat Enterprise Linux AS (v. 4 for 64-bit IBM POWER) | 4902 | |
| ☐ Red Hat Enterprise Linux ES (v. 4 for 32-bit x86) | 4376 | 0 |
| ☐ Red Hat Enterprise Linux ES (v. 4 for 64-bit Intel Itanium) | 4716 | 0 |
| ☐ Red Hat Enterprise Linux ES (v. 4 for AMD64/Intel EM64T) | 4983 | 0 |
| ☐ Red Hat Enterprise Linux AS (v. 3 for x86) | 4636 | 0 |
| ☐ Red Hat Enterprise Linux AS (v. 3 for Itanium) | 4862 | 0 |
| ☐ Red Hat Enterprise Linux AS (v. 3 for AMD64/Intel EM64T) | 5097 | 0 |
| ☐ Red Hat Enterprise Linux AS (v. 3 for iSeries and pSeries) | 4966 | 0 |
| ☐ Red Hat Enterprise Linux ES (v. 3 for x86) | 4655 | 0 |
| ☐ Red Hat Enterprise Linux ES (v. 3 for Itanium) | 4398 | 0 |
| ☐ Red Hat Enterprise Linux ES (v. 3 for AMD64/Intel EM64T) | 4601 | 0 |
| ☐ Red Hat Enterprise Linux AS (v. 2.1 for i386) | 3548 | 0 |
| ☐ Red Hat Enterprise Linux ES (v. 2.1 for i386) | 3039 | 0 |
| ☐ Red Hat Linux Advanced Server 2.1 for the Itanium Processor | 3002 | 0 |

MULTIPLE ORGANIZATION SUPPORT IN A NETWORKED SYSTEM

COPYRIGHT NOTICE

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright® 2008 Red Hat, Inc.

TECHNICAL FIELD

Embodiments of the present invention relate to support of multiple organizations, and more specifically to support of multiple organizations in a networked environment.

BACKGROUND

Conventionally, some software vendors deploy a server to a customer's internal network to manage and to maintain software licensed to the customer. The server may store profiles of the system locally. Typically, the server treats the customer's internal network and computing machines connected thereto as a single entity. In other words, the server manages the internal network, computing machines, and all data within the internal network in only one way. However, even when the customer is a large enterprise having different departments, the server nevertheless treats the entire enterprise as a single entity and manages all departments within the enterprise in the same way. Thus, the server is unable to address different needs of different departments within the enterprise. Furthermore, data security of the enterprise may be compromised because all data is accessible to all departments within the enterprise.

BRIEF DESCRIPTION OF THE DRAWINGS

The present invention is illustrated by way of example, and not by way of limitation, in the figures of the accompanying drawings and in which:

FIG. 3A illustrates one embodiment of a process to provide multiple organization support using a centralized server.

FIG. 3B illustrates one embodiment of a process to segregate data by organizations.

DETAILED DESCRIPTION

Figure 1:
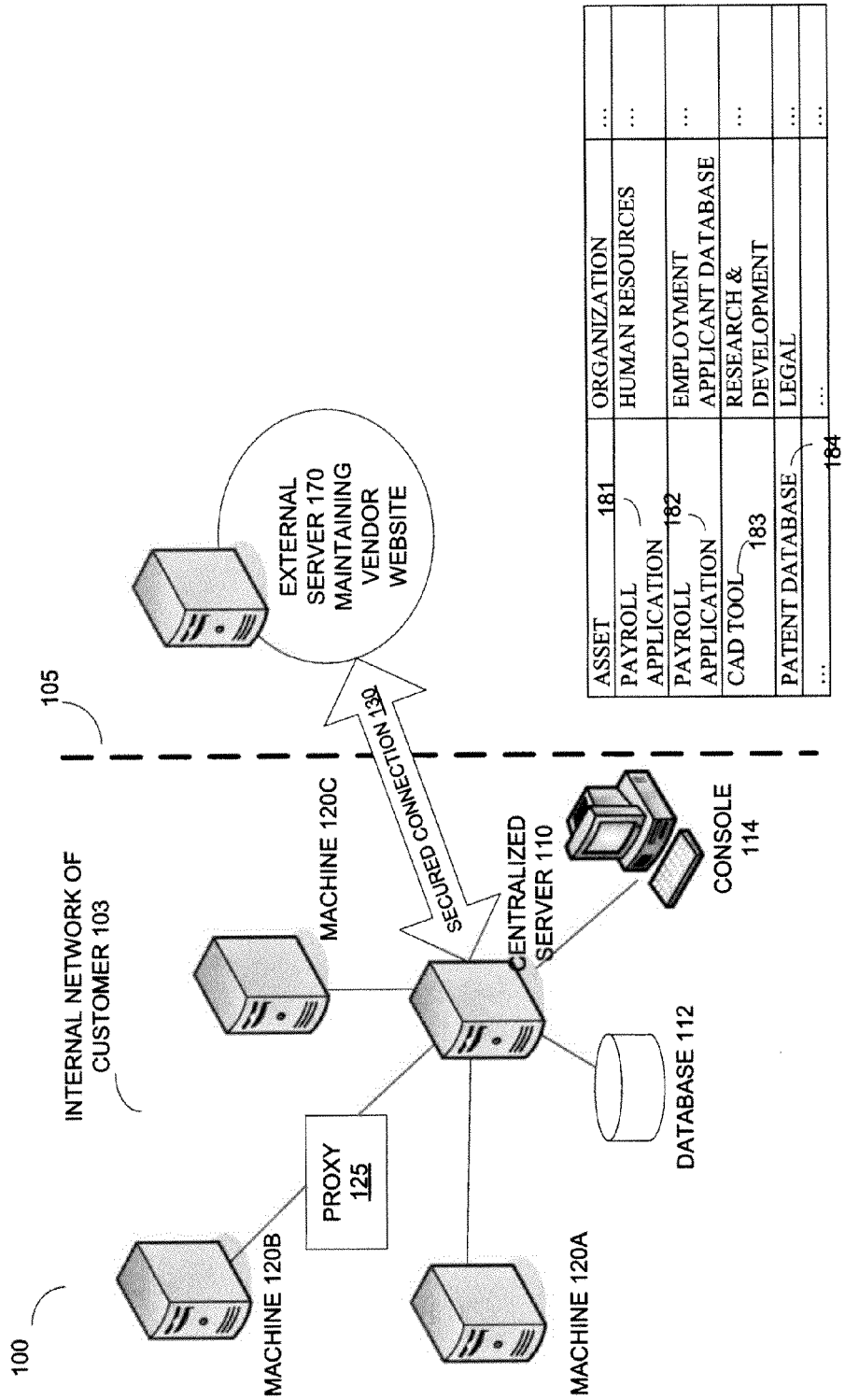
FIGS. 1A and 1B illustrate one embodiment of a system in which embodiments of the present invention may be implemented.

Described herein are some embodiments of multiple organization support in a networked environment. In one embodiment, a centralized server manages a networked system, which includes the centralized server and a set of computing machines coupled to each other within an internal network of a customer. The centralized server allows the customer to create organizations. The centralized server segregates data within the networked system by grouping the data within an organization. The centralized server may further manage each organization independent of the remaining organizations. Thus, the centralized server provides multiple organization support.

In one embodiment, the multiple organization support feature allows the customer to partition the centralized server into different organizations such that each organization has its own set of data, which may include entitlements, content, and provisioning information, etc. Access to a particular organization's set of data is restricted to the particular organization only. In other words, the remaining organizations are restricted from accessing the particular organization's set of data. As such, each organization is its own business or entity without any relation or tie to the other organizations on the centralized server. Such division of resources not only assists in allowing an administrator to manage a more efficient centralized server, but also creates a more secure centralized server by only allowing access to the necessary resources each organization consumes.

In one embodiment, the multiple organization support allows a single vendor to operate in a centralized environment, as well as decentralized management by giving individual third party vendors their own set of resources to manage and maintain under a larger resource set that is owned by the centralized server. This concept of management allows many possibilities, from separate third party vendors to multiple internal departments within a company or an enterprise. More details of multiple organization support are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a system in which embodiments of the present invention may be implemented. The system 100 includes an external server 170 maintained by a software vendor and an internal network 103 of a customer of the software vendor, coupled to each other via a secured connection 130, such as a virtual private network (VPN) over a public network (e.g., the Internet). Thus, the system 100 may be referred to as a connected setup. Alternatively, the external server 170 and the internal network 103 may not be communicably coupled to each other. Rather, data and information may be loaded onto machine-readable storage media, such as compact discs (CDs), flash memory cards with Universal Serial Bus (USB) connectors, etc. The machine-readable storage media may also be referred to as computer-readable storage media. The machine-readable storage media is then delivered to the customer's site to be loaded onto a centralized server within the internal network. As such, this system may be referred to as a disconnected setup.

In some embodiments, the internal network 103 of the customer further includes components shown on the left side of the dotted line 105. As illustrated in FIG. 1A, the internal network 103 of the customer includes a centralized server 110, a number of computing machines 120A-120C, a proxy 125, a database 112, and a console 114. The computing machines 120A-120C are physical hardware, such as servers, workstations, desktop personal computers (PCs), laptops, etc. The computing machines 120A-120C, the console 114, and the database 112 are coupled to the centralized server 110 within the internal network 103. In some embodiments, one or more of the customer's computing machines may be coupled to the centralized server 110 via a proxy, such as the proxy 125 between the computing machine 120B and the centralized server 110. The proxy 125 may cache software packages to enhance performance, speed up downloads, and offload some of the operations from the centralized server 110.

Unlike some conventional centralized servers, which treats the entire internal network, including computing machines coupled thereto, of a customer as a single organization only, the centralized server 110 allows the customer to create multiple organizations and to manage these organizations independently. In one embodiment, the centralized server 110 generates graphical user interface (GUI) via which the customer may create organizations. Details of some exemplary GUIs are discussed below. After multiple organizations have been created, the centralized server 110 associates data in the internal network 103 with its respective organizations in some embodiments. As mentioned above, the data may include various types of data of the customer's internal network 103 and computing machines 120A-120B, such as entitlements, content, and provisioning information, etc. The centralized server 110 may further store the data into the database 112 and instructs the database 112 to organize the data stored by the respective organizations. In some embodiments, the database 112 includes a relational database. Alternatively, the database 112 may include a flat file database. FIG. 1B illustrates one embodiment of some data stored in the database 112.

Referring to FIG. 1B, the data includes a number of entries, such as entries 181-184, to represent various assets of a customer, including applications installed in an internal network and/or computing machines of the customer. In the current example, the customer is a company having various departments. Organizations have been created to correspond to the departments, such as human resources department, research and development department, legal department, etc. Entry 181 represents payroll application, which is associated with the organization of human resources. Entry 182 represents employment applicant database, which is also associated with the organization of human resources. Entry 183 represents a computer aided design (CAD) tool, which is associated with the organization of research and development department. Entry 184 represents a patent database, which is associated with the organization of legal department. As shown in FIG. 1B, the entries 181-184 of various assets are organized by their respective organizations. The entries 181-184 may be segregated by the organizations. Thus, the assets represented by the entries 181-184 may be managed by their respective organizations independently. Moreover, access to various assets may be restricted to their associated organizations only. For example, when a user of the research and development department attempts to access the payroll application, the attempt may be denied because the user does not belong to the human resource department. In some embodiments, different types of access may be allowed depending on the organizations. For example, a user of the research and development department may be allowed to view the patent database, but not to modify the patent database, whereas a user of the legal department may be allowed to both view and modify the patent database.

Referring back to FIG. 1A, the internal network 103 includes a local area network (LAN) protected from unauthorized access. For instance, a firewall may be employed at a gateway or proxy of the LAN to prevent unauthorized access to the LAN. Through the secured connection 130, the centralized server 110 within the internal network 103 may access the external server 170 external to the internal network 103. For example, the external server 170 may host a website of the software vendor and the centralized server 110 may establish the secured connection 130 to the website using one or more Internet security protocol (e.g., secure socket layer (SSL), secure shell (SSH), transport layer security (TLS), etc.). Thus, the centralized server 110 may securely retrieve or download various items from the external server 170, such as items that are available only by purchase and/or license (e.g., metadata of an operating system, such as Red Hat Enterprise Linux provided by Red Hat, Inc. of Raleigh, N.C., information on provisioning, executables of client applications, etc.). The items retrieved are stored locally within the customer's internal network 103. In one embodiment, the items retrieved are stored in a storage device internal to the centralized server 110. Alternatively, the items retrieved may be stored in the database 112 coupled to the centralized server 110 within the internal network 103. Alternatively, the items retrieved may be stored in a Network-Attached Storage (NAS) device. After downloading the items from the external server 170, the centralized server 110 may terminate the secure connection 130 such that no talk back to the external server 170 is allowed. As such, the above approach allows the customer to take the customer's system off the external network (e.g., the Internet), and hence, providing more optimization, flexibility, and control of the system to the customer.

The centralized server 110 may synchronize with the external server 170 by checking with the external server 170 for updates and/or changes to the items retrieved previously. Such synchronization may be performed periodically and/or in response to user requests. Alternatively, the external server 170 may notify the centralized server 110 when there are changes and/or updates to the items previously provided to the centralized server 110. When there is a change to an item previously retrieved, the centralized server 110 may retrieve the change from the external server 170 and then update a copy of the item on the centralized server 110 accordingly, or the centralized server 110 may simply retrieve an updated version of the item to replace the previously retrieved version. In some embodiments, synchronization is performed via one or more channels within the secured connection 130 between the centralized server 110 and the external server 170. A channel as used herein refers to a collection of software packages organized into a logical grouping. For example, the set of packages that make up an operating system is organized into a channel in some embodiments. Different types of items may be associated with different channels such that the centralized server 110 may choose to synchronize a subset of the channels as needed. For example, information related to provisioning virtual hosts and virtual guests may be associated with a Tool channel.

Alternatively, the centralized server 110 may synchronize with the external server 170 via machine-readable storage media, such as CDs, flash memory cards with USB connectors, etc. The machine-readable storage media may also be referred to as computer-readable storage media. When there is a change to an item previously provided to the centralized server 110, the change to the item or an updated version of the item may be stored onto the machine-readable storage media from the external server 170. Then the machine-readable storage media may be delivered to the customer, who would provide the machine-readable storage media to the centralized server 110. By providing the machine-readable storage media to the centralized server 110, the centralized server 110 obtains the metadata and information from the machine-readable storage media and subsequently, uses the metadata and information to manage the computing machines 120A-120C as well as the virtual hosts and virtual guests provisioned on the computing machines 120A-120C.

Figure 2:
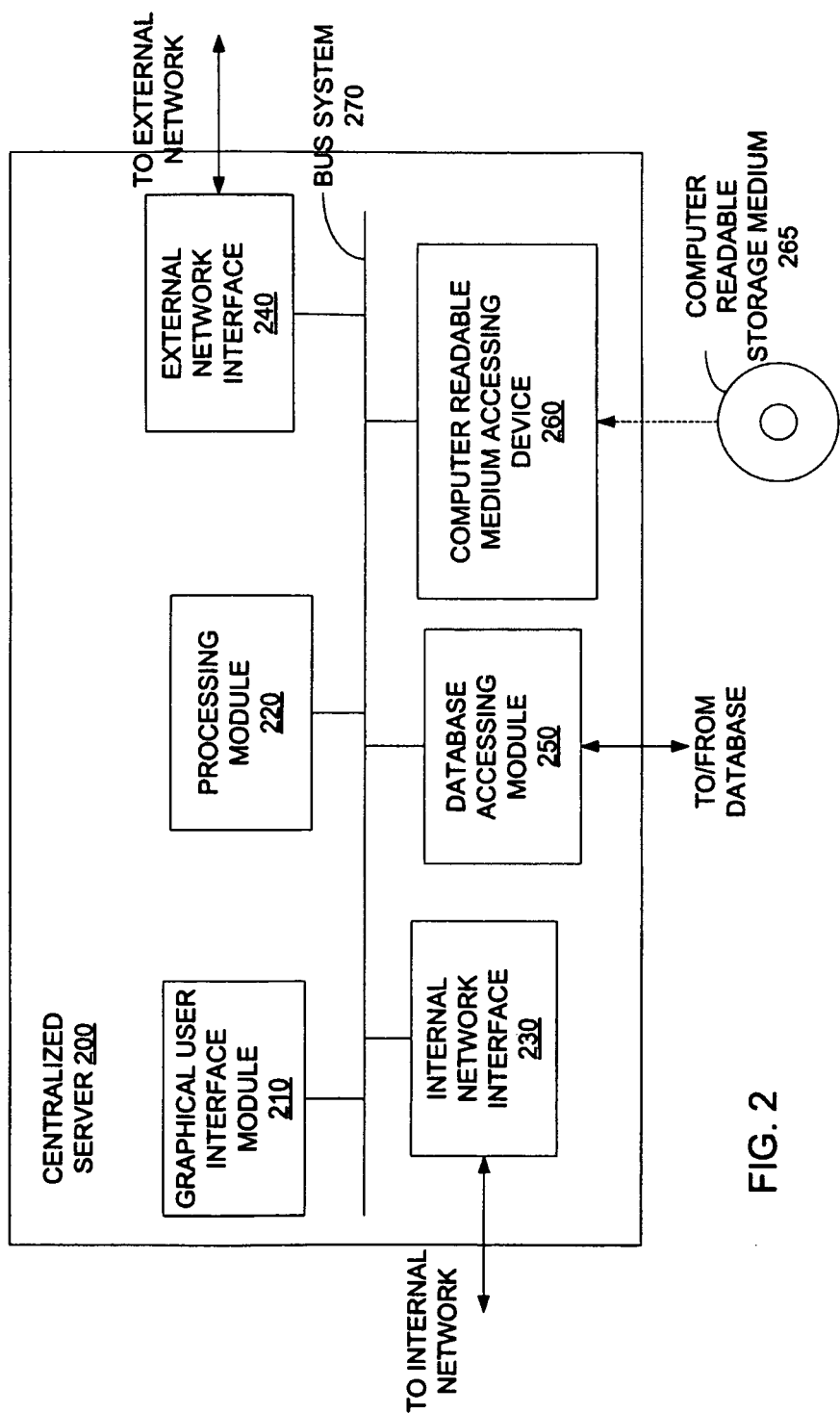
FIG. 2 illustrates a functional block diagram of one embodiment of a centralized server.

FIG. 2 illustrates a functional block diagram of one embodiment of a centralized server. The centralized server 200 includes a graphical user interface module 210, a processing module 220, an internal network interface 230, an external network interface 240, a database accessing module 250, and a computer-readable medium accessing device 260, which are coupled to each other via a bus system 270.

In some embodiments, the centralized server 200 is communicably coupled to an internal network of a customer of a software vendor via the internal network interface 230. The internal network further includes one or more physical computing machines of the customer, such as servers, workstations, desktop PCs, laptops, etc. The centralized server 200 is further coupled to an external network, such as the Internet, via the external network interface 240. The external network interface 240 may establish a secured connection to access a external server provided by the software vendor (such as the external server 170 in FIG. 1A) to retrieve various items from the external server, such as metadata of an operating system, information on provisioning virtual hosts and virtual guests, application upgrades, etc. These items retrieved may be stored locally within the internal network.

Alternatively, the centralized server 200 may obtain the metadata of an operating system, information on provisioning virtual hosts and virtual guests, application upgrades, etc., from a computer-readable storage medium 265 removably coupled to the computer-readable medium accessing device 260. Some examples of the computer-readable storage medium 265 and computer-readable storage medium accessing device 260 include a CD and a CD-ROM drive, a flash memory card with a USB connector and a USB drive, etc. The external server of the software vendor may store the metadata of an operating system, information on provisioning virtual hosts and virtual guests, application upgrades, etc., onto the computer-readable storage medium 265, which is then delivered to the customer for the centralized server's 200 use.

In some embodiments, the centralized server 200 further includes a graphical user interface (GUI) module 210. The GUI module 210 is operable to generate a GUI to allow users to create organizations. Some exemplary GUIs are discussed in details below. Based on the input by the users via the GUI, the processing module 220 creates these organizations and associates data with the respective organizations. In one embodiment, the database accessing module 250 stores the data as entries into a database. The entries are organized by the organizations in the database. One embodiment of some entries is shown in FIG. 1B discussed above. As such, the data is segregated by organizations so that the processing module 220 may manage the data of one organization independent of the other organizations.

FIG. 3A illustrates one embodiment of a process to provide multiple organization support using a centralized server. The process may be performed by processing logic that may comprise hardware (e.g., circuitry, dedicated logic, programmable logic, microcode, etc.), software (such as instructions run on a processing device), firmware, or a combination thereof. For example, the processing module 220 of the centralized server 200 shown in FIG. 2 may perform at least part of the process.

Initially, processing logic generates GUIs to allow a customer to create organizations, update organizations created, and/or delete organizations created (processing block 310). For example, in one embodiment, processing logic may generate a GUI to allow an administrator of a particular organization to update information of the organization. In one embodiment, processing logic may generate user interface control (e.g., a button) in the GUI to allow the administrator to delete an organization when the organization is no longer relevant. In some embodiments, processing logic allows deletion of organizations one organization at a time. Referring to the above example, where the centralized server serves a company with many departments, a first department may be deleted when the first department is merged into a second department. Alternatively, processing logic allows deletion of multiple organizations substantially simultaneously. For instance, where the centralized server serves a managed hosting service provider providing rack space, the provider may need to disable multiple non-paying accounts in each billing cycle on a regular basis. Then processing logic segregates data by the organizations to isolate the organizations (processing block 315). One embodiment of a method to segregate data is discussed in details below. Processing logic allows each organization to access only its associated data (processing block 320). Processing logic prevents the organizations to access data not associated with the respective organizations (processing block 325).

FIG. 3B illustrates one embodiment of a process to segregate data by organizations. The process may be performed by processing logic that may comprise hardware (e.g., circuitry, dedicated logic, programmable logic, microcode, etc.), software (such as instructions run on a processing device), firmware, or a combination thereof. For example, the processing module 220 of the centralized server 200 shown in FIG. 2 may perform at least part of the process.

Processing logic represents data of a customer's internal network and/or computing machines with entries in a database (processing block 330). The data may include entitlements, applications, provisioning information, etc. Then processing logic associates the entries with the respective organizations based on customer input (processing block 335). For example, the customer may have provided information on various organizations when creating the organizations, such as the number of entitlements allowed to an organization, the level of the right to access certain applications, etc. Then processing logic may store the entries by the organization in the database (processing block 340).

Figure 4A:
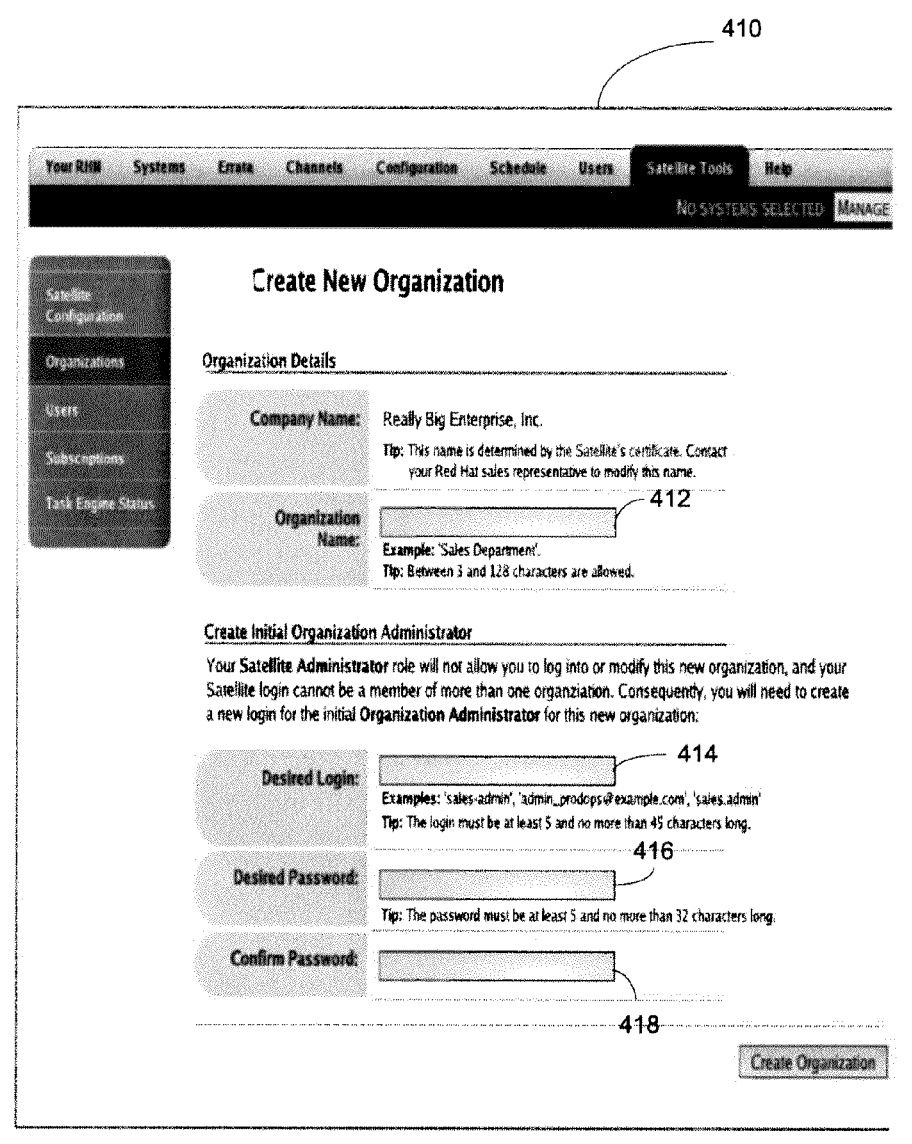

FIG. 4A illustrates one embodiment of a GUI to create a new organization. The GUI 410 provides a field 412 for entering an organization name, such as "sales department." The GUI 410 further allows creation of an organization administrator for this new organization. In one embodiment, the GUI 410 provides a field 414 to allow entry of a login name of the organization administrator, such as "sales-admin." The GUI 410 further provides a field for entering a password of the organization administrator and another field 418 for confirming the password.

Figure 4B:
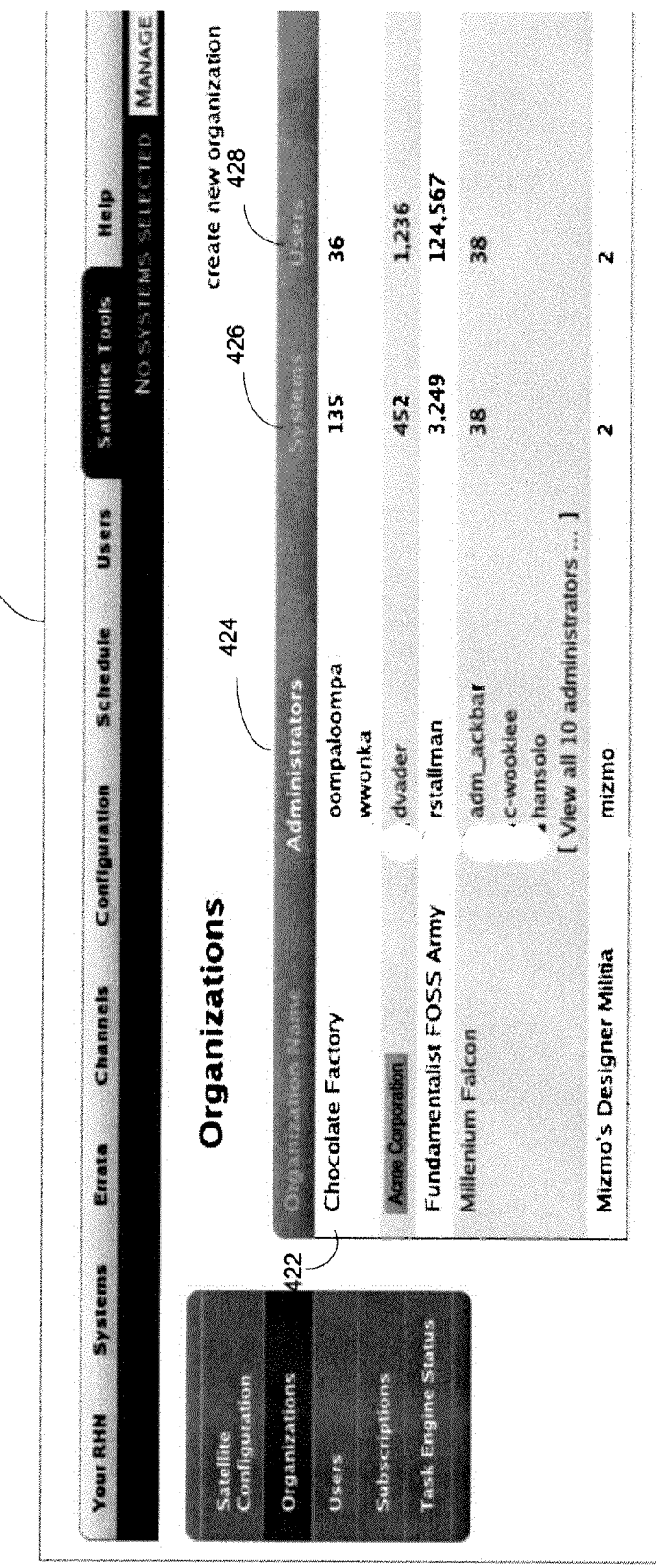
FIGS. 4A-4N illustrate some embodiments of some graphical user interfaces.

FIG. 4B illustrates one embodiment of a GUI to show a list of organizations available on a centralized server. The organizations 422 in the GUI 420 are organizations created and not yet deleted. The GUI 420 further shows some information of the organizations, include a list of organization administrators 424, number of systems used 426, and number of users 428 of each organization.

FIG. 4C illustrates one embodiment of a GUI showing a list of users across multiple organizations. The GUI 430 shows a list of users 432 on a centralized server and their corresponding organizations 434.

Figure 4D:
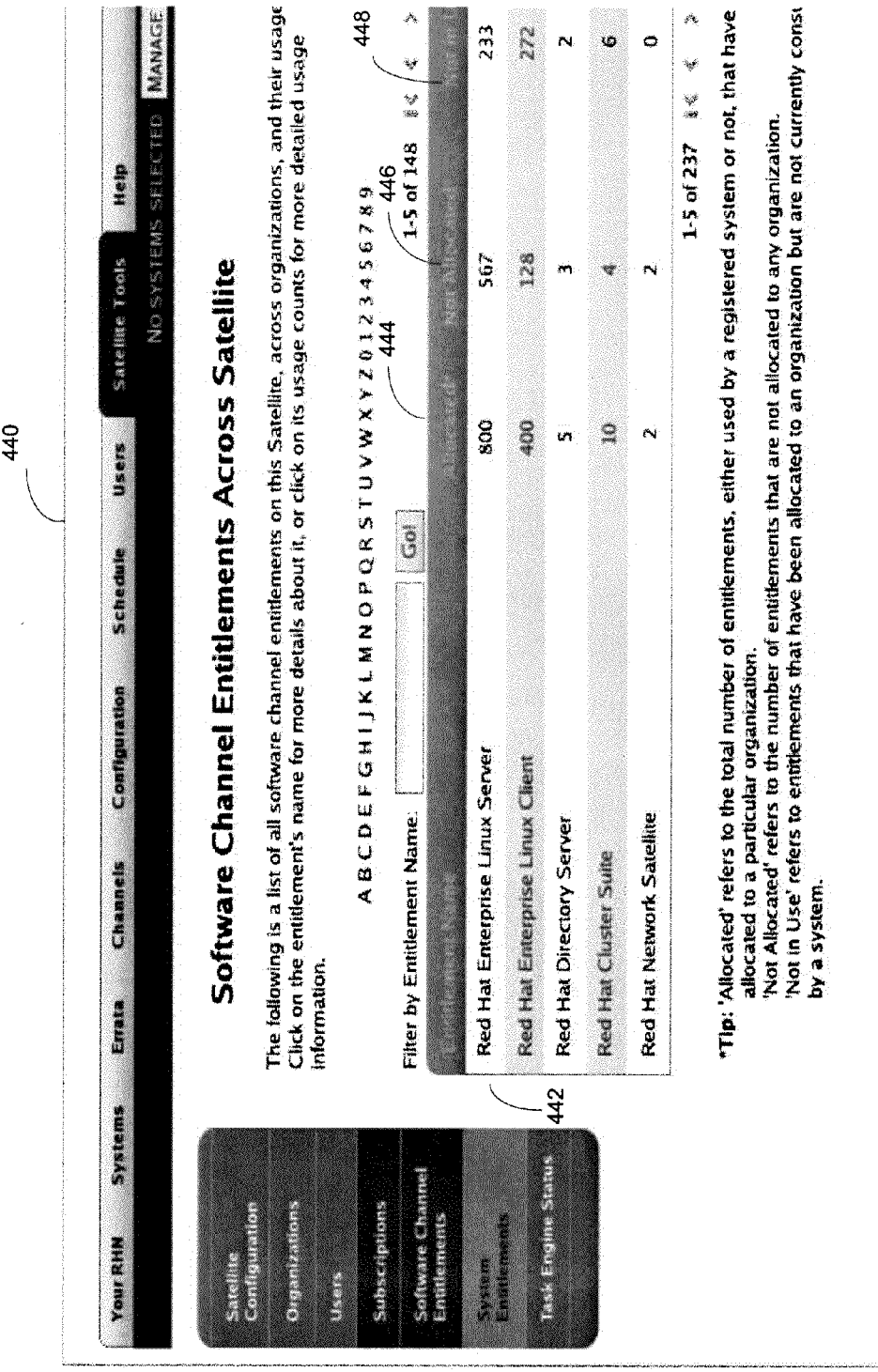

FIG. 4D illustrates one embodiment of a GUI showing a list of software channel entitlements across multiple organizations. The GUI 440 shows a list of software channel entitlements 442 and their corresponding numbers of entitlements allocated 444, not allocated 446, and not in use 448. In one embodiment, the number of entitlements allocated 444 refers to the total number of entitlements, whether used by a registered system or not, that have been allocated to a particular organization. The number of entitlements not allocated 446 may refer to the number of entitlements that are not allocated to any organization. The number of entitlements not in use 448 refers to entitlements that have been allocated to an organization but are not currently consumed by a system.

FIG. 4E illustrates one embodiment of a GUI showing a list of system entitlements across multiple organizations. The GUI 450 shows a list of entitlement names 452 and their corresponding numbers of entitlements allocated 454, not allocated 456, and not in use 458. In one embodiment, the number of entitlements allocated 454 refers to the total number of entitlements, whether used by a registered system or not, that have been allocated to a particular organization. The number of entitlements not allocated 456 may refer to the number of entitlements that are not allocated to any organization. The number of entitlements not in use 458 refers to entitlements that have been allocated to an organization but are not currently consumed by a system.

Figure 4F:
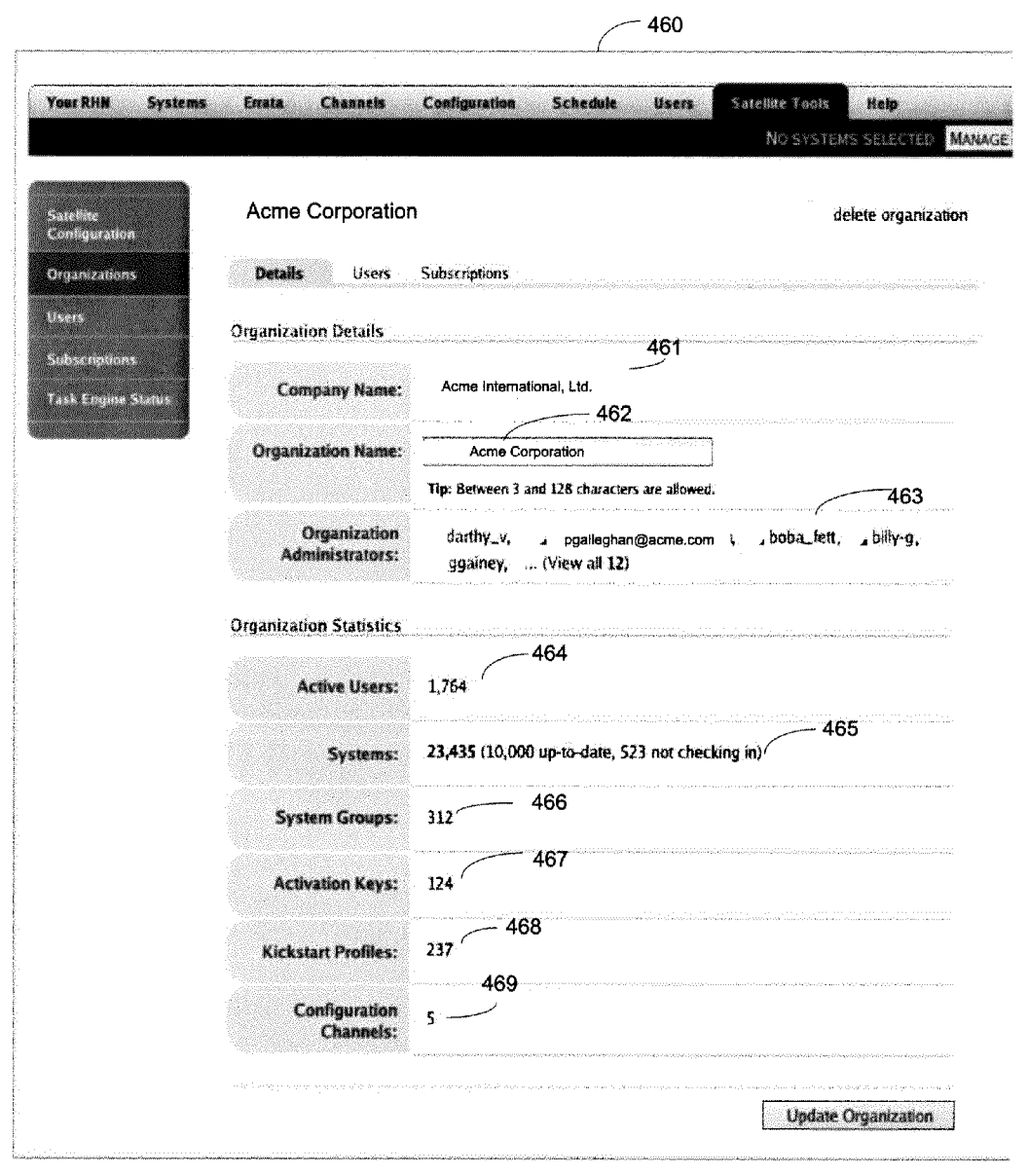

FIG. 4F illustrates one embodiment of a GUI showing details of an exemplary organization, Acme Corporation. In the current examples, the centralized server serves a company having multiple organizations. The GUI 460 shows the name of the company 461, the name of the organization 462, a list of organization administrators 463, and various statistics of the organization. In one embodiment, the statistics includes the number of active users 464 in the organization, the number of systems 465 used by the organization, the number of system groups 466, the number of activation keys 467 the organization has, the number of kickstart profiles 468 associated with the organization, and the number of configuration channels 469 of the organization.

FIG. 4G illustrates one embodiment of a GUI showing a list of all users in the exemplary organization, Acme Corporation. The GUI 470 shows a list of login names 472 of all users in the organization of Acme Corporation, their respective real names 474, and an indication 476 of whether a particular user is an organization administrator. In one embodiment, a user may modify the details of these users 472 if the user is logged into the organization of Acme Corporation and has organization administrator privileges. For instance, Chewbacca Wookiee 472a and Hello Kitty 472c are allowed to modify the details of the users 472 in the current example.

Figure 4H:
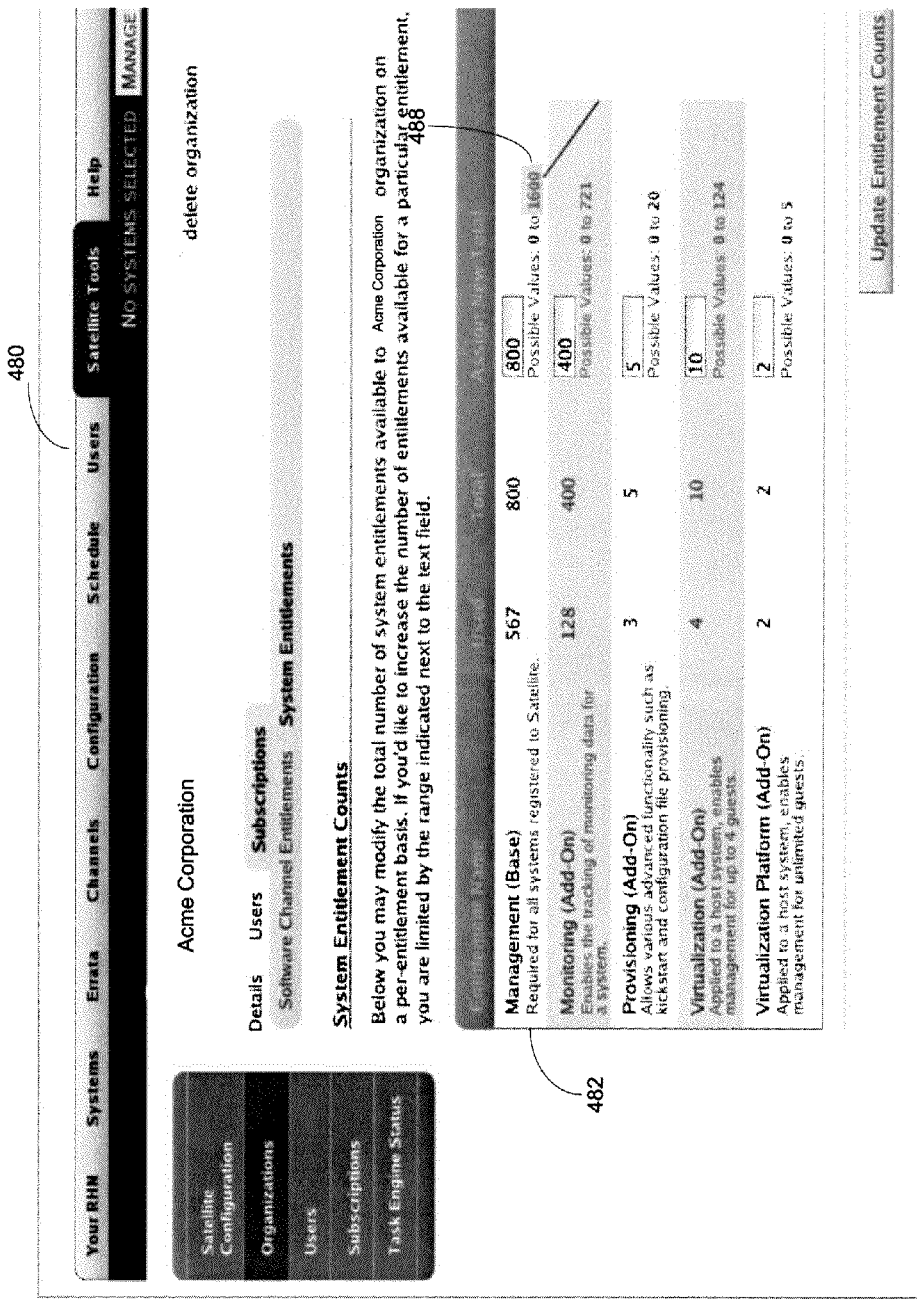

FIG. 4H illustrates one embodiment of a GUI showing details of the system entitlements of the exemplary organization, Acme Corporation. The GUI 480 shows a list of system entitlements 482 available to the organization of Acme Corporation. The organization administrator may modify the total number of system entitlements available to the organization of Acme Corporation on a per-entitlement basis via the GUI 480. In one embodiment, the number of entitlements available for a particular entitlement may be increased, limited to the range 488 indicated next to the text field.

Figure 4I:
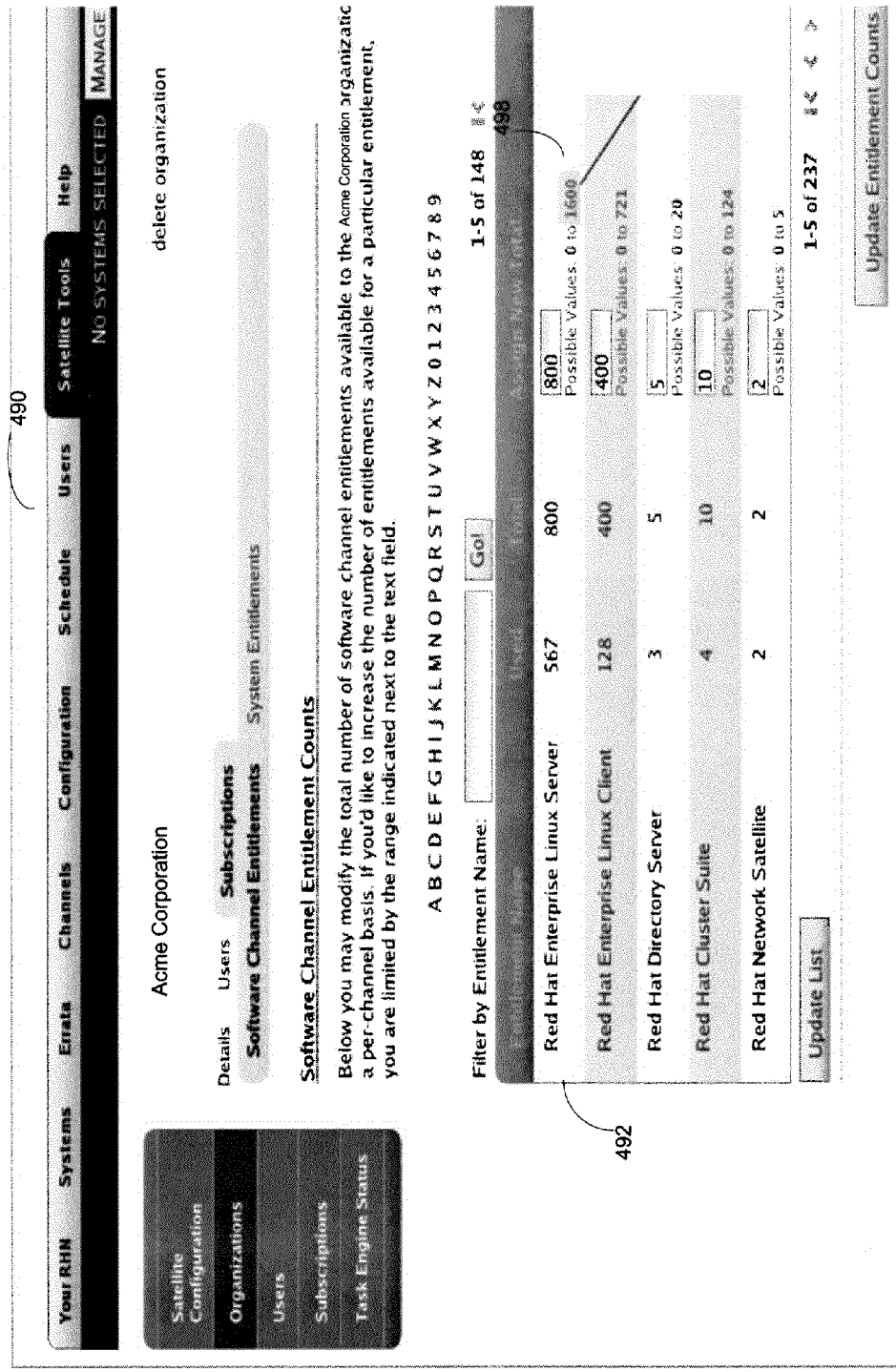

FIG. 4I illustrates one embodiment of a GUI showing details of the software channel entitlements of the exemplary organization, Acme Corporation. The GUI 490 shows a list of software channel entitlements 492 available to the organization of Acme Corporation. The organization administrator may modify the total number of system entitlements available to the organization of Acme Corporation on a per-channel basis via the GUI 490. In one embodiment, the number of entitlements available for a particular entitlement may be increased, limited to the range 498 indicated next to the text field.

Figure 4J:
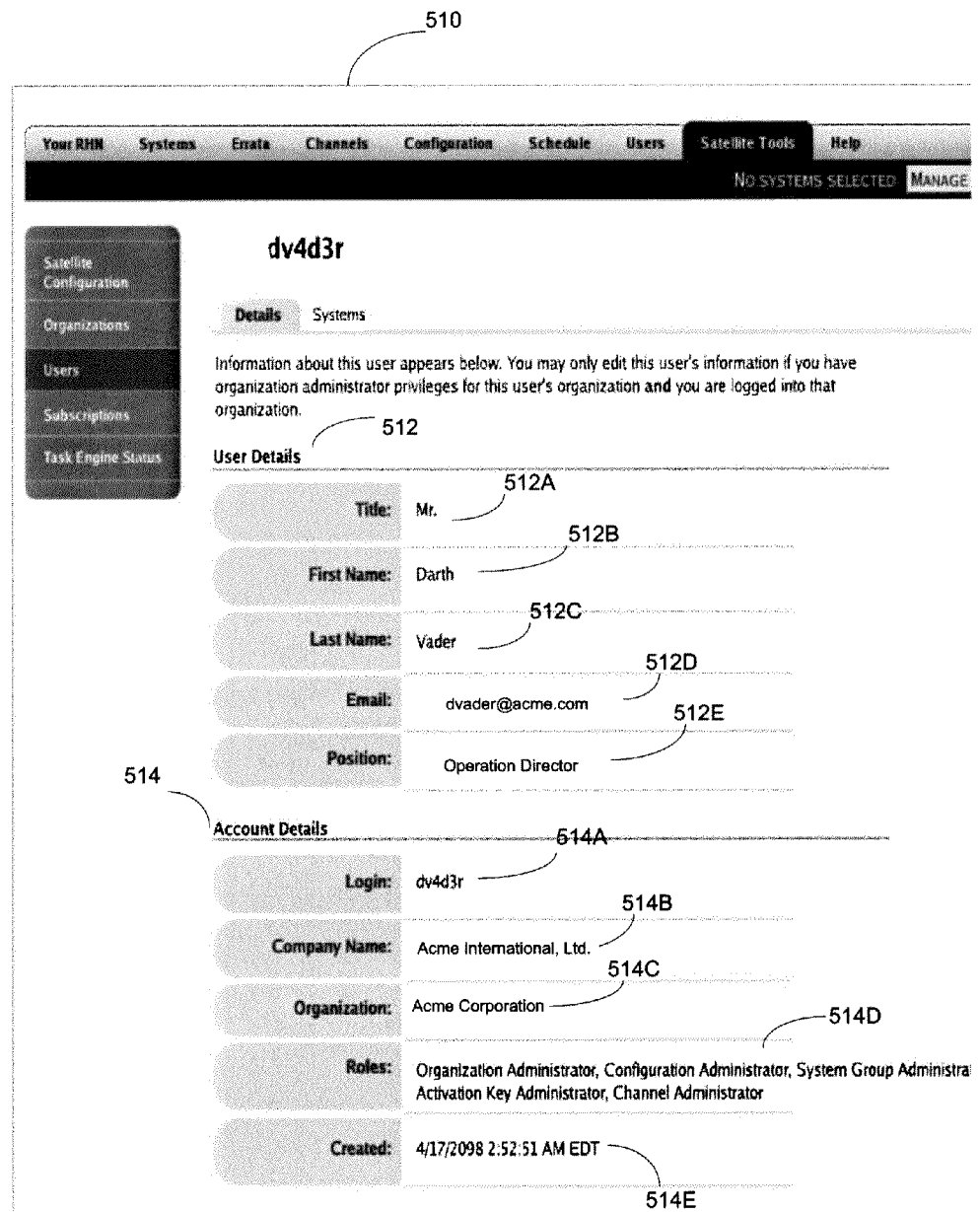

FIG. 4J illustrates one embodiment of a GUI showing details of an exemplary user, dv4d3r. The GUI 510 shows both user details 512 and account details 514 of the exemplary user. In one embodiment, the user details 512 include the title 512a, the first name 512b, the last name 512c, the email 512d, and the position 512e of the exemplary user. In one embodiment, the account details 514 include the login name 514a, the company name 514b, the organization name 514c, the roles of the user 514d, and the time and date the account is created 514e. In one embodiment, a user may edit the information on this GUI 510 if the user has organization administrator privileges for this user's organization and is logged into that organization.

Figure 4K:
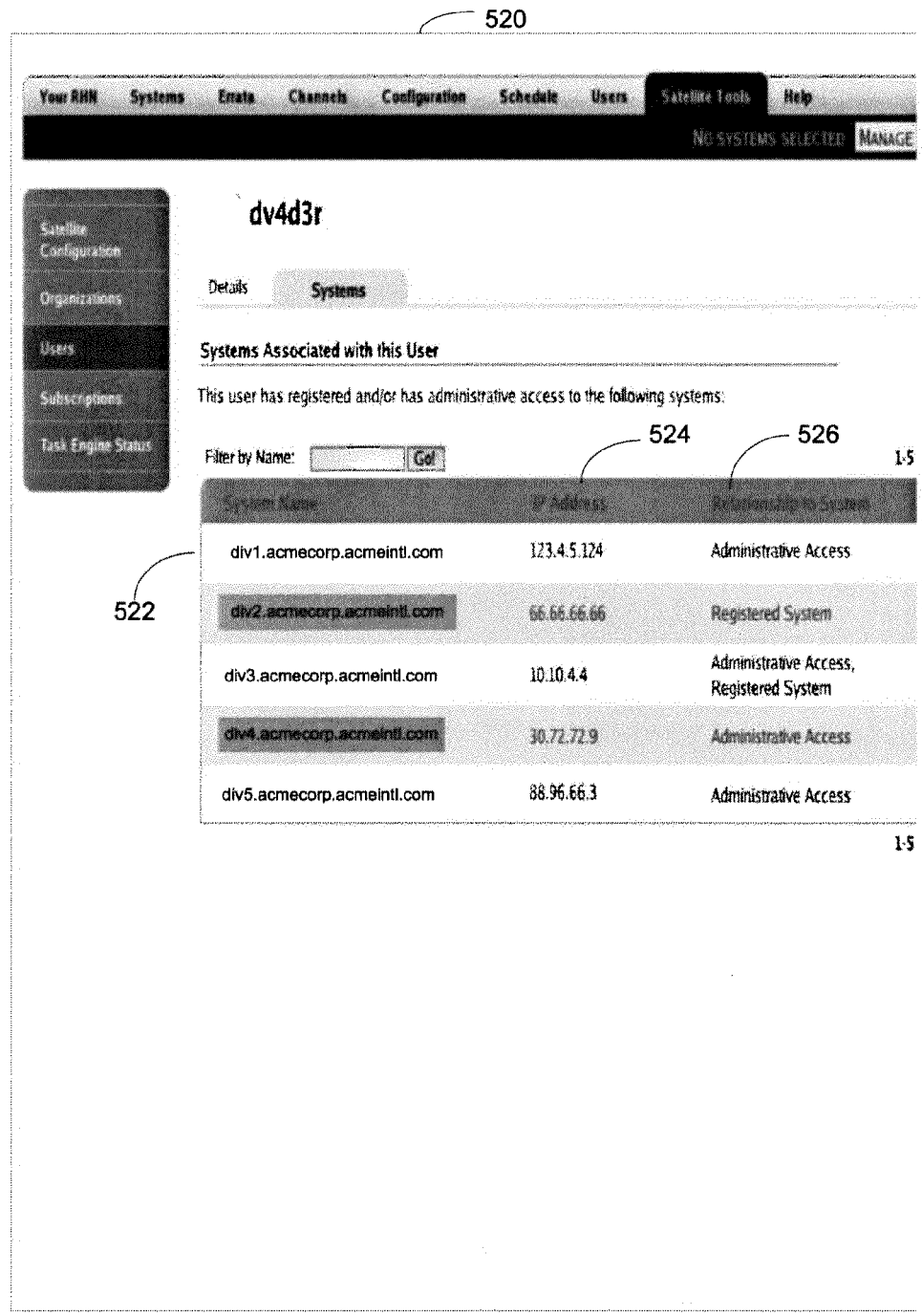

FIG. 4K illustrates one embodiment of a GUI showing systems associated with the exemplary user, dv4d3r. The GUI 520 shows a list of systems 522, in which the exemplary user dv4d3r, has registered and/or has administrative access. The GUI 520 further shows the internet protocol (IP) address 524 and the relationship of the user to the respective system 526 in the GUI 520.

FIG. 4L illustrates one embodiment of a GUI showing details of an exemplary software channel entitlement of an organization. The GUI 530 shows the entitlement usage 532 and access granted by this entitlement 534. In one embodiment, the entitlement usage 532 includes the total number of entitlements 532A, the number of entitlements used 532B, the number of free entitlements 532C, and organization usage 532D. In one embodiment, the list 534 includes software channels to which a single "Red Hat Enterprise Linux (core server)" entitlement may be used to gain access to.

Figure 4M:
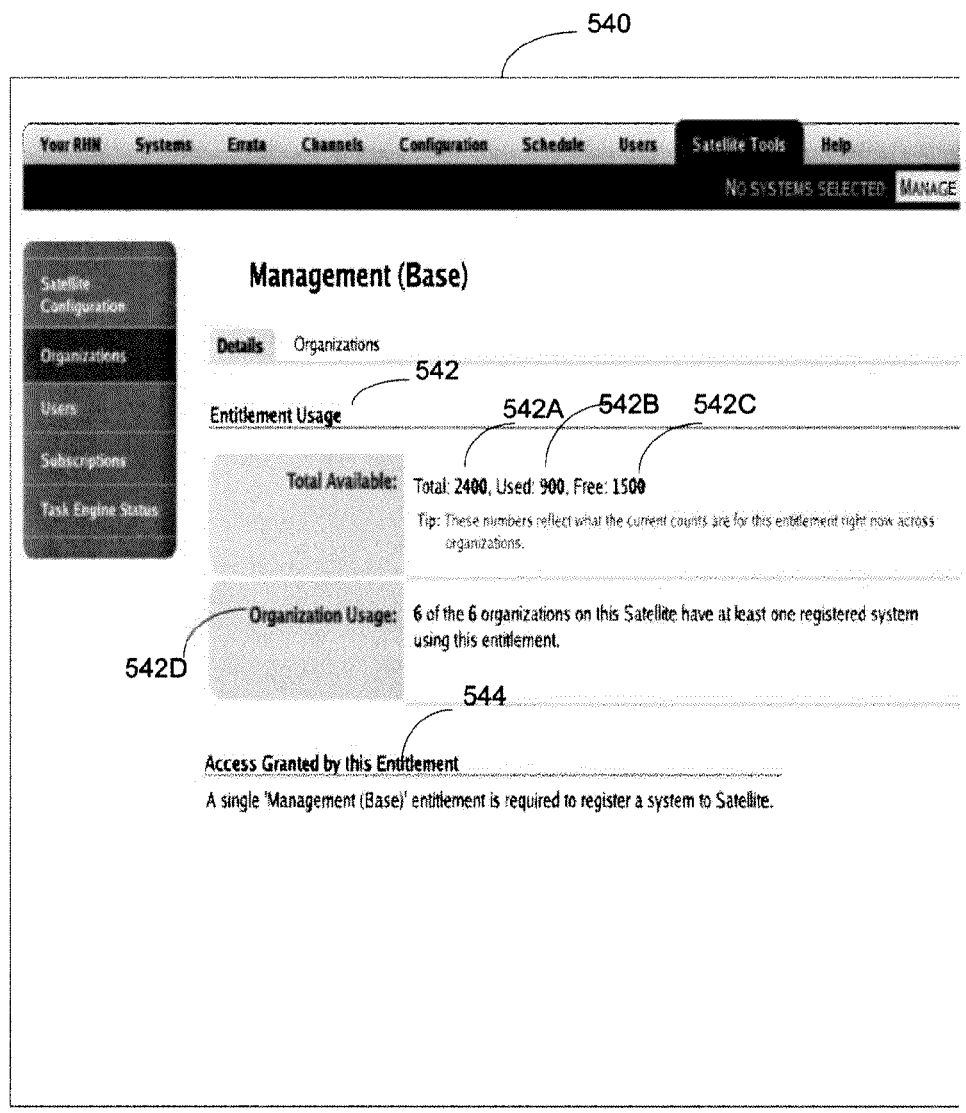

FIG. 4M illustrates one embodiment of a GUI showing details of an exemplary system entitlement of an organization. The GUI 540 shows the entitlement usage 542 and access granted by this entitlement 544. In one embodiment, the entitlement usage 542 includes the total number of entitlements 542A, the number of entitlements used 542B, the number of free entitlements 542C, and organization usage 542D. In one embodiment, the details shown under the access granted by this entitlement 544 comes from the organization object's entitlement list.

Figure 4N:
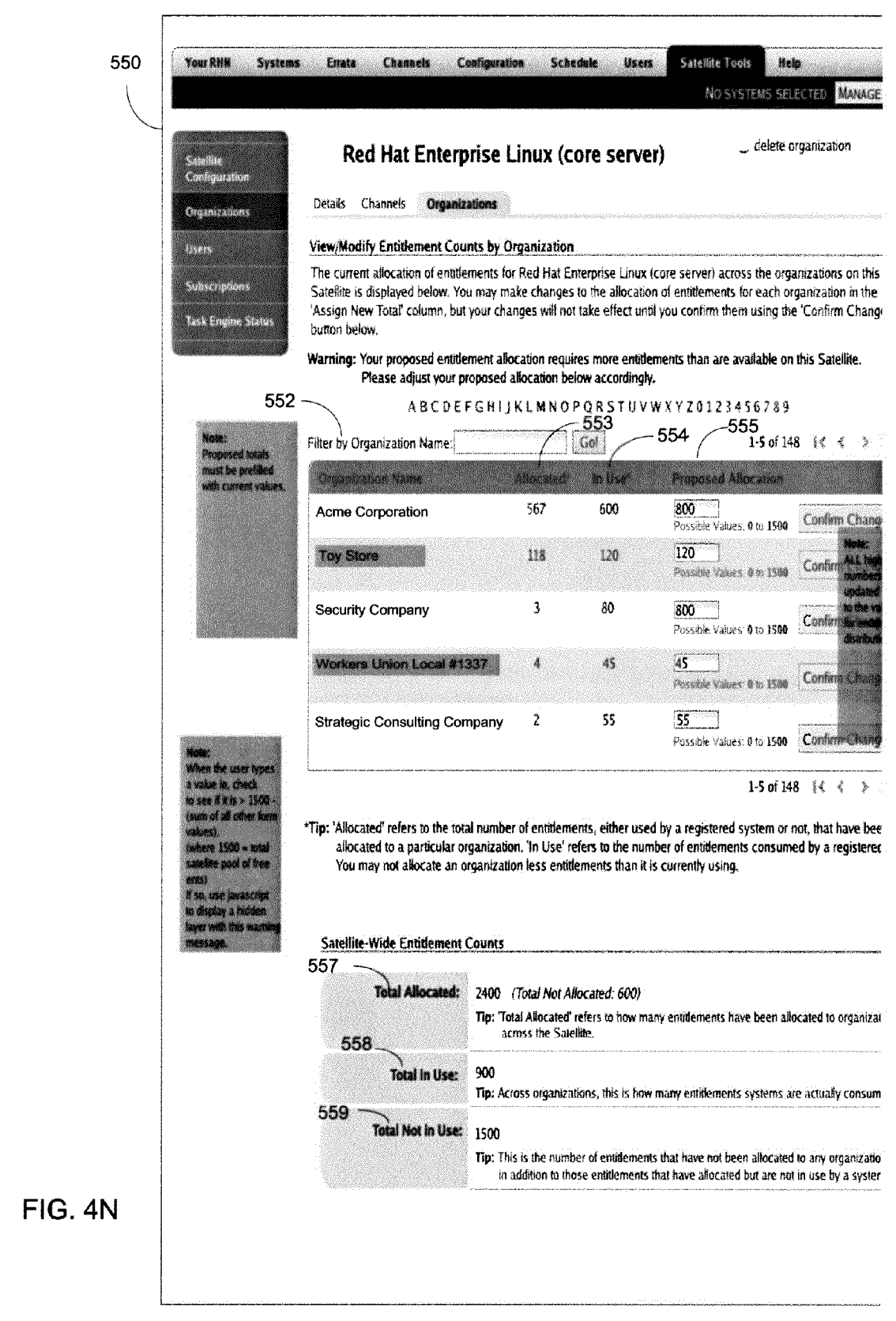

FIG. 4N illustrates one embodiment of a GUI to allow organization administrators to view and/or modify entitlement counts by organization on a centralized server. The GUI 550 displays a list of organizations 552, along with the number of entitlements allocated 553, the number of entitlements in use 554, and a field for entry of the number of proposed allocation 555. In one embodiment, the field 555 is initially filled with the existing number of entitlements allocated. The organization administrator may modify the count in the field 555. However, lowering the proposed allocation to be less than the number of entitlements in use 554 may trigger a warning in some embodiments. In one embodiment, the GUI 550 further displays a total number of entitlements allocated 557 on the centralized server, the total number of entitlements in use 558 on the centralized server, and the total number of entitlements not in use 559 on the centralized server.

Figure 5:
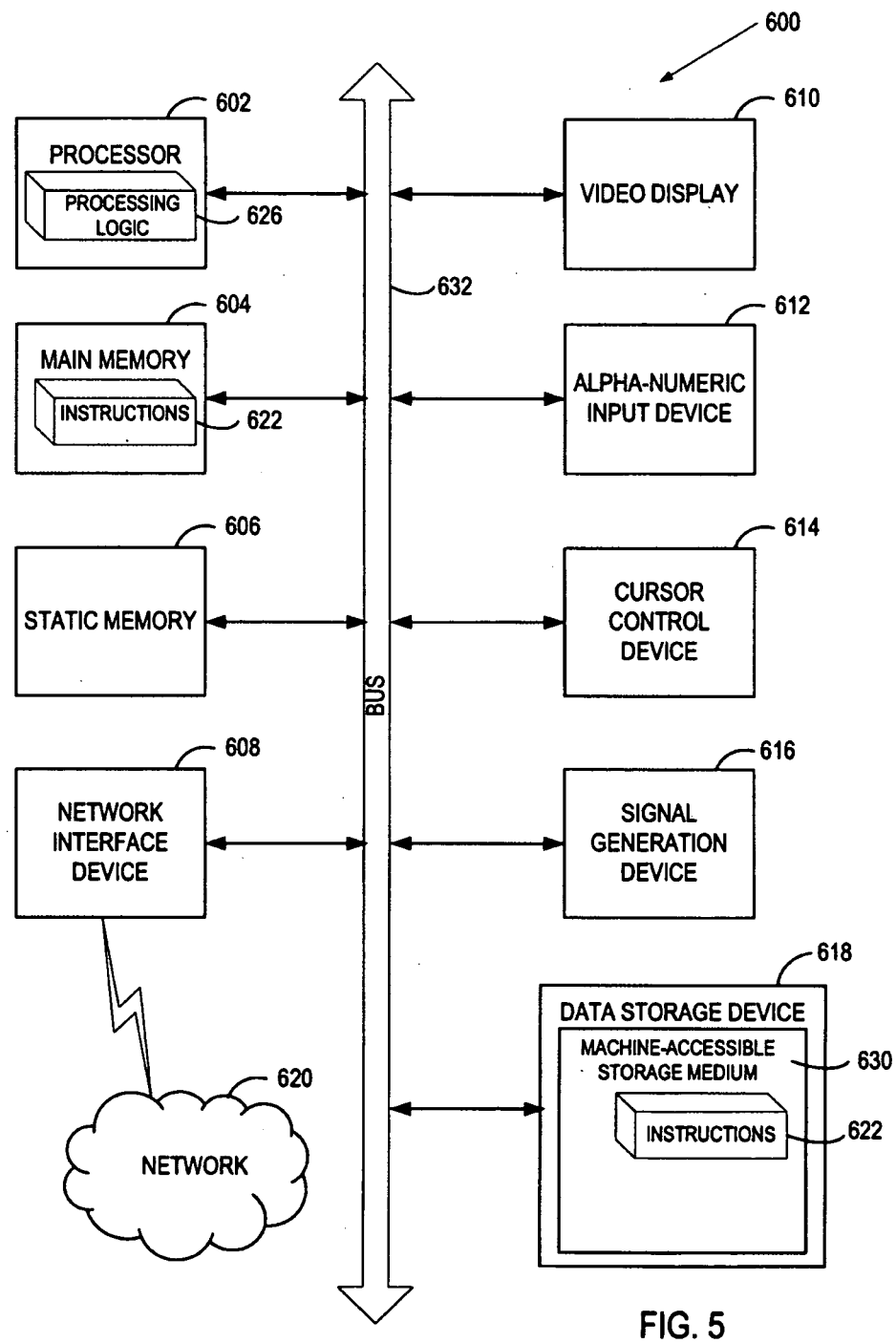
FIG. 5 illustrates a block diagram of an exemplary computer system, in accordance with one embodiment of the present invention.

FIG. 5 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of multiple organization support in a networked system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
managing, by a server, a networked system comprising the server and a set of computing machines connected by an internal network of a customer, wherein the networked system stores operating system metadata and virtual machine provisioning information for each of a plurality of organizations defined by the customer; and
segregating, by the server, the operating system metadata and virtual machine provisioning information associated with a first organization from the operating system metadata and virtual machine provisioning information associated with a second organization.

2. The method of claim 1, further comprising:
generating a first graphical user interface (GUI) that enables the customer to define the plurality of organizations.

3. The method of claim 1, further comprising:
generating a second GUI that enables the customer to delete an organization from the plurality of organizations.

4. The method of claim 1, further comprising:
generating a third GUI that enables the customer to update information associated with an organization.

5. The method of claim 1, wherein the segregating comprises:
representing the operating system metadata and virtual machine provisioning information by a plurality of entries in a database coupled to the server; and
associating each of the plurality of entries with a respective one of the plurality of organizations within the database.

6. The method of claim 1, wherein the customer is a company and the plurality of organizations correspond to departments of the company.

7. The method of claim 1, further comprising:
preventing an organization from accessing operating system metadata associated with another organization.

8. The method of claim 1, further comprising:
preventing an organization from accessing virtual machine provisioning information associated with another organization.

9. An apparatus comprising:
a server to segregate data within a networked system, wherein the networked system stores operating system metadata and virtual machine provisioning information for each of a plurality of organizations defined by a customer, and wherein the segregating isolates operating system metadata and virtual machine provisioning information associated with an organization from operating system metadata and virtual machine provisioning information associated with other organizations, and wherein the networked system comprises the server and a set of computing machines connected by an internal network of the customer; and
a database to store the operating system metadata and virtual machine provisioning information within the internal network.

10. The apparatus of claim 9, wherein the server is also to generate a first GUI that enables the customer to define the plurality of organizations.

11. The apparatus of claim 9, wherein the server is also to generate a second GUI that enables the customer to delete an organization from the plurality of organizations.

12. The apparatus of claim 9, wherein the server is also to generate a third GUI that enables the customer to update information associated with an organization.

13. The apparatus of claim 9, wherein the database is also to:
represent the operating system metadata and virtual machine provisioning information by a plurality of entries; and
associate each of the entries with a respective one of the plurality of organizations.

14. The apparatus of claim 9, wherein the customer is a company and the plurality of organizations correspond to departments of the company.

15. The apparatus of claim 9, wherein the server is also to prevent an organization from accessing operating system metadata associated with another organization.

16. The apparatus of claim 9, wherein the server is also to prevent an organization from accessing virtual machine provisioning information associated with another organization.

17. A non-transitory computer-readable medium embodying instructions that, when executed by a server, will cause the server to perform operations comprising:
managing, by the server, a networked system comprising the server and a set of computing machines connected by an internal network of a customer, wherein the networked system stores operating system metadata and virtual machine provisioning information for each of a plurality of organizations defined by the customer; and
segregating, by the server, the operating system metadata and virtual machine provisioning information associated with a first organization from the operating system metadata and virtual machine provisioning information associated with a second organization.

18. The non-transitory computer-readable medium of claim 17, wherein the operations further comprise:
generating a first graphical user interface (GUI) that enables the customer to define the plurality of organizations.

19. The non-transitory computer-readable medium of claim 17, wherein the operations further comprise:
generating a second GUI that enables the customer to delete an organization from the plurality of organizations.

20. The non-transitory computer-readable medium of claim 17, wherein the operations further comprise:
generating a third GUI that enables the customer to update information associated with an organization.

21. The non-transitory computer-readable medium of claim 17, wherein the segregating comprises:
representing the operating system metadata and virtual machine provisioning information with a plurality of entries in a database coupled to the server; and
associating each of the plurality of entries with a respective one of the plurality of organizations.

22. The non-transitory computer-readable medium of claim 17, wherein the customer is a company and the plurality of organizations correspond to departments of the company.

23. The non-transitory computer-readable medium of claim 17, wherein the operations further comprise:
preventing an organization from accessing operating system metadata associated with another organization.

24. The non-transitory computer-readable medium of claim 17, wherein the operations further comprise:
preventing an organization from accessing virtual machine provisioning information associated with another organization.

* * * * *